Nov. 8, 1927.  
C. I. WALKER  
INDICATOR  
Filed April 17, 1922  
1,648,287
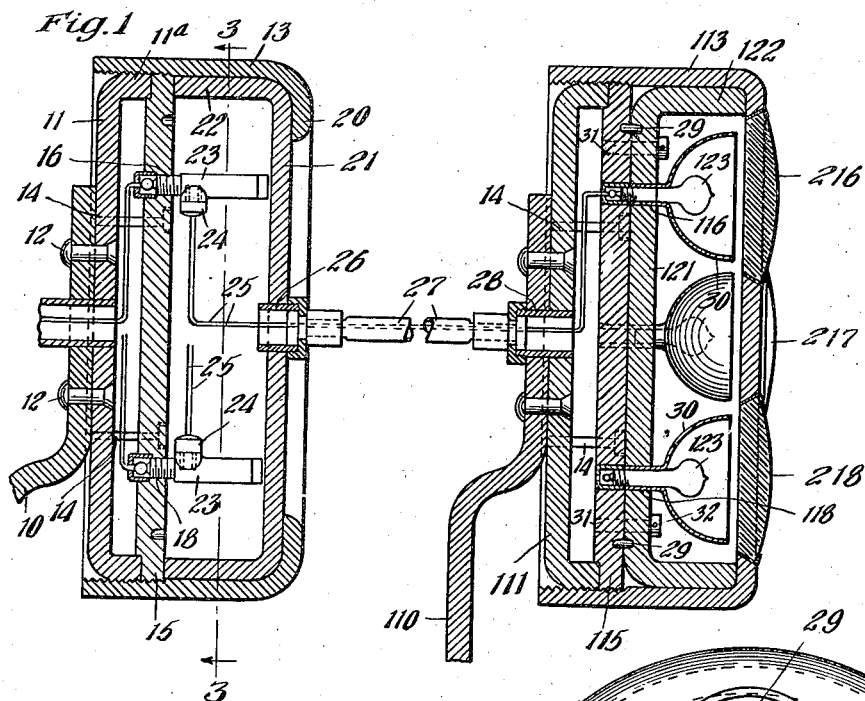
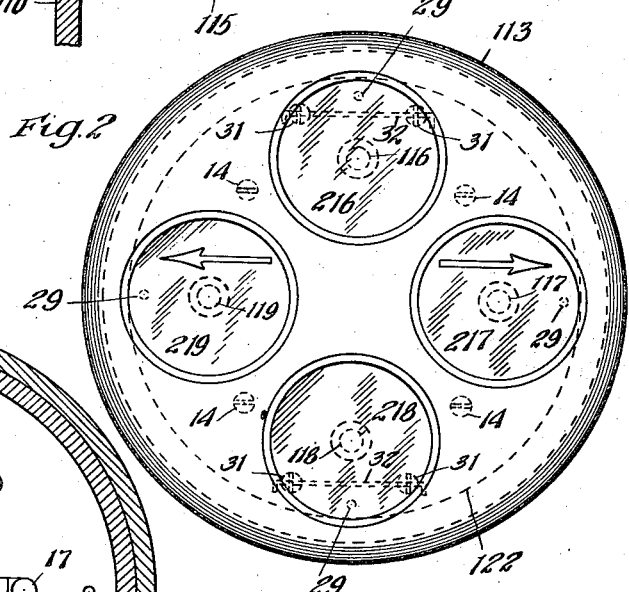
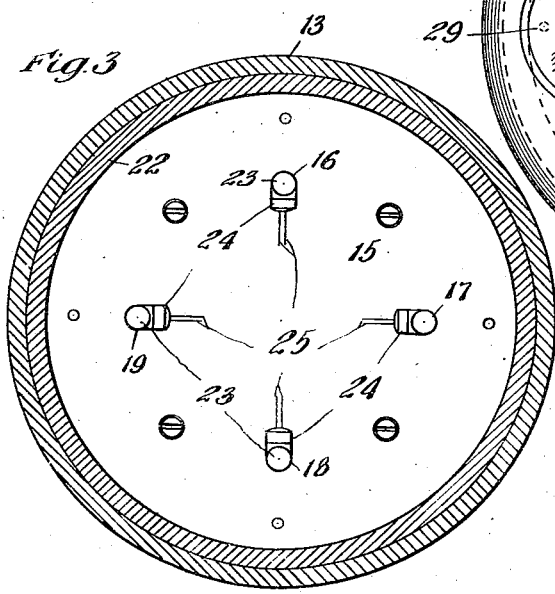
Inventor  
Charles I. Walker  
By Geo. I. Haight  
His Atty.

Patented Nov. 8, 1927.

1,648,287

UNITED STATES PATENT OFFICE.

CHARLES IRVING WALKER, OF LOS ANGELES, CALIFORNIA.

INDICATOR.

Application filed April 17, 1922. Serial No. 553,844.

This invention relates to improvements in indicators.

In the operation of automobiles, trucks and other automotive vehicles, it has become practically necessary to employ a visual signal at the rear and sometimes at the front end of the automotive vehicle to indicate a change in direction of travel or in speed in order to promptly advise other drivers.

The use of a truck with a series of trailers in the transportation of freight is becoming more widespread and there is a demand for some signaling or indicating device which will be visible on the rear trailer and which will be operable in accordance with conditions obtaining on the head or leading truck.

One object of my invention is to provide a signaling or indicating device especially adapted for automobiles, trucks and other automotive vehicles wherein provision is made for visibly indicating either an intention to stop, an intention to go straight ahead or an intention to turn to the left or the right.

A more specific object of the invention is to provide an arrangement especially adapted for use interchangeably or in combination in a leading truck or trailer when a series of machines is being driven.

A specific object of the invention is to provide an arrangement used for an electrical indicator proper on a machine and which may be readily converted to a junction or distributing box for the electrical connections of a similar indicating device of a following machine.

In the drawing forming a part of this specification, Figure 1 is a sectional view of my invention shown applied to the rear end of a leading machine and the rear end of a trailing machine of a truck train, the coupling being broken between the two devices. Figure 2 is an elevational view of the arrangement shown at the right hand end of Figure 1. Figure 3 is a sectional view corresponding to the section line 3—3 of Figure 1.

In said drawing, 10 denotes a bracket secured to the rear end of a truck or other automotive vehicle and to which bracket is secured a base 11 as by rivets 12, or other suitable fastening devices. The base 11 is formed with an outturned annular flange 11$^a$ threaded on the exterior so as to detachably receive a casing or shell 13.

Detachably secured to the base 11 as by screws 14 is a support in the form of a plate 15 which, in the instance shown, is provided with four sockets 16, 17, 18 and 19 uniformly disposed around the center of the plate 15. The plate 15 is slightly rabbeted so as to fit within the flange 11$^a$, as clearly shown in Figure 1. The casing 13 at the outer end has an inturned integral flange 20 which fits over a cup-like shell 21, the annular flange 22 of which fits within the casing 13 and bears against the plate 15. With this arrangement it will be observed that all of the parts are held in assembled relation by screwing the casing 13 on the base 11 and the parts may be disassembled by first taking off the casing 13.

Suitable electric wires are run from the usual battery of the automotive vehicle to each of the sockets 16, 17, 18 and 19, one wire on the negative side of the circuit in each instance being electrically connected with the outside of the socket and the other wire with the insulated contact point within it. Each of said sockets is adapted to receive a standard electric bulb or, as shown in the left hand portion of Figure 1, a keyless connector body as indicated at 23. In actual practice, the length of the connector bodies 23 will be made such that, when the shell 21 is in place, the connector bodies 23 cannot work out. Associated with each of the connector bodies 23 is a polarity cap 24 from which the two wires 25—25 of each socket are continued through a bushing 26 in the shell 21. The four sets of wires 25 are then conducted through a suitable cable 27 from the head machine to the next following machine where the cable will be entered through another bushing 28 in the bracket 110 and base 111 of the indicator thereon.

On the following or last machine, the arrangement of bracket and base 110—111 are the same as previously described for the leading machine as is also the construction of the support or plate 115. The casing 113, in the case of the rear indicating arrangement, is interchangeable with the first described casing 13 but instead of being open, it is provided with four lenses 216, 217, 218 and 219, preferably respectively colored red, green, white and blue. Said lenses 216 to 219 inclusive will be uniformly located with respect to the center of the device and will correspond in position to the sockets 116, 117, 118 and 119, which will also be provided in the plate 115, as previously described in connection with the arrangement at the left hand end of Figure 1. As will be understood by those skilled in the art, the wires from the socket 16 on the one arrangement will be connected to the corresponding socket 16 on the other arrangement with the proper polarity maintained so as to avoid any danger of short circuiting, the sockets, conductors and caps being suitably marked for the purpose.

In the arrangement at the right hand end of Figure 1, a shell 121 is employed, the main web of which bears against the plate 115 and which is held in fixed relation with the latter and in proper adjusted position by suitable means such as the dowel pins 29. The shell 121 is formed with an annular outwardly extending flange 122 fitting within the casing 113 and adapted to be held in assembled position by the latter. On the inner side of the shell 121 are secured four cup-shaped reflectors 30—30 corresponding to the four signal positions beneath the lenses 216 to 219. The wall of the shell 121 is suitably apertured concentric with the reflectors 30 to permit the lamp bulbs 123 being screwed into the sockets 116 to 119 inclusive. The shell 121 may be additionally secured to the plate 115 by screws 31 and the latter prevented from jarring loose by lock wires 32 passed through the heads of said screws, as best illustrated in Figure 2.

The red lens 216 will preferably have the word "Danger" indicated thereon; the lens 217 will preferably have an arrow pointing toward the right and the words "To right" thereon; the lens 218 will preferably have the words "Straight ahead" thereon; and the lens 219 will preferably have an arrow pointing toward the left and the words "To left" thereon.

I have not shown any system of switches to control the making or breaking of any of the four different circuits, inasmuch as such switches or controls may be of many different types either operable manually and selectively by the driver or automatically from different parts of the control and steering mechanism of the car.

From the preceding description, considered in connection with the drawing, it will be seen that I am enabled to indicate on the rear car of a series or train of cars, the desired signal, the same being controllable or governed from the head or leading car. It will also be obvious that a similar signal may be located at the head or front end of the leading car or any other car and connected in parallel with the signaling or indicating device on the rear car. It will also be observed that the removable parts of the arrangement shown at the left hand end of Figure 1, are interchangeable with the corresponding parts of the arrangement at the right hand end of Figure 1 so that, although the arrangement shown at the left of Figure 1 is illustrated in the nature of a junction or distributing box, nevertheless it can be immediately converted to a signal proper such as shown at the right hand end of Figure 1. Similarly the arrangement at the right hand end of Figure 1 may be converted into a junction or distributing box similar to that shown at the left hand end. In this manner a signal or indicator embodying my invention as employed on a truck, for instance, may be used as a signal proper when the truck is traveling free and, when the truck is being employed to pull a series of trailers, the signal or indicator may be converted so as to extend the electrical connections to a following machine and have the indications appear on the last machine.

The arrangement shown is simple, inexpensive, readily interchangeable for use singly or in combination with others, and is effective to advise drivers of the intended action to be taken by the head machine with which the signal is used.

Although I have herein shown and described what I now consider the preferred manner of carrying out the invention, the same is by way of illustration only and not by way of limitation. All changes and modifications are contemplated that come within the scope of the claims appended hereto.

I claim:

1. In a device of the character described, the combination with a base, socket supporting means on said base, and a plurality of sockets carried by said means; of a removable casing on said base enclosing the same and said sockets; a second base supported independently of said first named base and casing, said second base having socket supporting means mounted thereon and a plurality of sockets carried by said means; electrical connections from the first named sockets to said second named sockets; a removable casing attached to said second base and enclosing the same and the second named sockets; and a plurality of lamps within said last named casing mounted in said second named sockets.

2. In a signalling apparatus for a plurality of automotive vehicles operated simultaneously, the combination with a base secured to one of the automotive vehicles; of a support on said base; a plurality of electrical terminals carried by said support; a removable casing secured to said base; a second base secured to one of the vehicles; a support on said base; a plurality of correspondingly arranged electrical terminals carried by said support; electrical conductors from the first named terminals to the corresponding second named terminals; lamps electrically connected with the second named terminals; and a removable casing secured to said second base and provided with lenses corresponding to the lamps carried thereby, said first named casing and said last named casing being interchangeable.

3. In a signaling apparatus, the combination with a base member and a socket carrying support on said base member, said support being provided with a socket; of a plug detachably fitted into said socket; a casing housing said plug, said casing being detachably secured to said base; a second base member; a socket carrying support on said last named base member provided with a socket; a lamp detachably fitted into said last named socket; a second casing housing said lamp, said last named casing being detachably secured to said second base member said first and second named casings being interchangeable; an electric conductor connecting said second named socket with said plug; and an electric conductor connected to said first named socket.

4. In a signaling apparatus, the combination with a plurality of shells; a plurality of like base members, one of which is detachably secured to each shell; a casing within each shell; a plurality of similar supporting plates, one of which is disposed within each shell and interposed between the corresponding base and casing; a plurality of insulated electric terminals on each of said plates; lamps electrically connected with the terminals of one of said plates; and electric conductors connecting corresponding terminals of the respective plates.

5. In an indicator, the combination with a casing having a side wall; a plate removably mounted within said casing; a base member engaging one side of said plate, said base member being detachably secured to said casing and closing one end thereof; a shell having a side wall, said shell being telescoped within said casing, engaging the opposite side of said plate and also having the side wall thereof in engagement with the side walls of the casing; and a plurality of sockets mounted in said plate, each of said sockets being adapted to interchangeably receive a bulb and a plug.

In witness that I claim the foregoing I have hereunto subscribed my name this 13th day of March, 1922.

CHARLES IRVING WALKER.